No. 793,033. PATENTED JUNE 20, 1905.
I. KITSEE.
ELECTRIC CIRCUIT.
APPLICATION FILED AUG. 16, 1901. RENEWED OCT. 16, 1903.
2 SHEETS—SHEET 1.
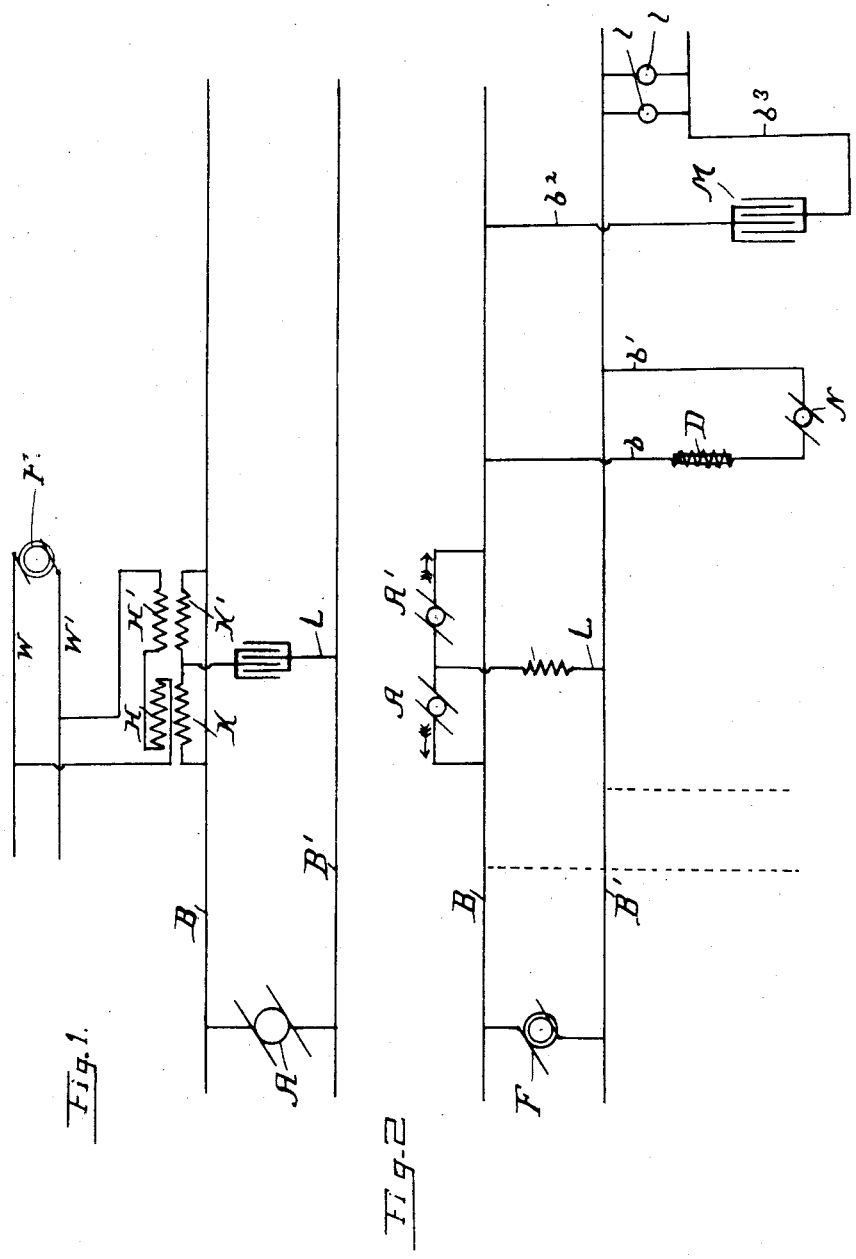

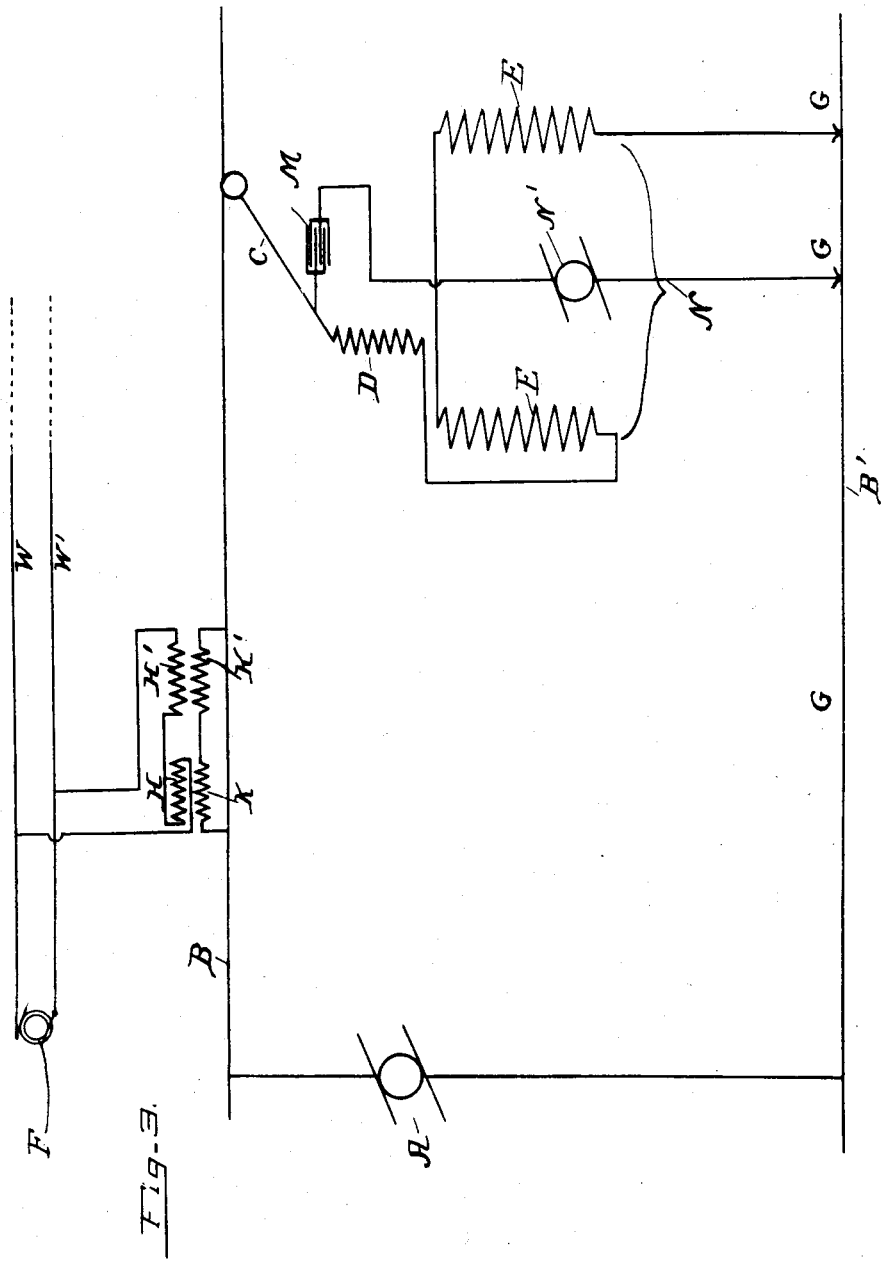

No. 793,033. Patented June 20, 1905.

UNITED STATES PATENT OFFICE.

ISIDOR KITSEE, OF PHILADELPHIA, PENNSYLVANIA.

ELECTRIC CIRCUIT.

SPECIFICATION forming part of Letters Patent No. 793,033, dated June 20, 1905.

Application filed August 16, 1901. Renewed October 16, 1903. Serial No. 177,310.

*To all whom it may concern:*

Be it known that I, ISIDOR KITSEE, of the city and county of Philadelphia, State of Pennsylvania, have invented certain new and useful Improvements in Electric Circuits, of which the following is a specification.

My invention relates to an improvement in electric circuits and the method of feeding consuming devices from same.

In electric transmission it is often advantageous to have for certain consuming devices a straight or direct current and for certain other consuming devices an alternating or phase current. So, also, is it advantageous that parts of certain consuming devices should be fed by straight current, while other parts of the same consuming devices should be fed by alternating or phase current. Under "phase-current" I understand single-phase as well as multiphase current.

The object of my invention is to arrange and connect the generators of these currents to the line of transmission in such a manner that both currents may be transmitted without interference with one line-wire; and it is also the object of my invention to so arrange and connect the consuming devices placed in the transmitting-circuit that one or the other of said consuming devices shall be supplied with one or the other of said currents.

To this end my invention consists of the arrangements substantially as illustrated in the drawings, described in the specification, and more clearly pointed out in the claims following the specification.

Referring to the drawings, Figure 1 is a diagrammatic view of the transmitting-line having connected thereto a source of direct or straight current and a source of alternating or phase current. Fig. 2 is a similar view as Fig. 1, but the connections to the line-wire of the sources of different currents reversed and wherein consuming devices are connected to the circuit. Fig. 3 is a similar view as Fig. 1, illustrating the manner in which the field of a motor may be supplied with a direct current and the armature of said motor with an alternating or phase current over one supply-wire.

In Fig. 1, A designates a generator from which is taken a direct or straight current; B and B', the line of transmission; F, a generator from which an alternating or phase current is taken; W W', the line-wires for same; H and H', the primaries of converters, of which K and K' are the secondaries. L is the line-wire connecting one of the lines of transmission with the secondaries. As will be seen from this figure, the source of direct current A is connected in series as to the line of transmission. To the source of alternating or phase current F are connected the primaries H and H' of two converters, the secondaries K and K' of which are connected to a short part of the line-wire in a manner so that they are short-circuited through that part. It is necessary in this arrangement that the in the secondaries K and K' at one and the same time induced or generated impulses should oppose each other, and for that reason either the primaries H and H' or the secondaries K and K' should be wound or connected in opposition as to each other. In the drawings I have illustrated the primaries as to consist of two parts H and H'. The part H is connected, as is clearly illustrated in the drawings in Fig. 1, in opposition as to the part H'. The current impulses, therefore, if flowing through H'—say from right to left—will at one and the same time flow through H from left to right and the induced impulses in K' will flow from left to right at one and the same time as the impulses induced in K are flowing from right to left. Both impulses will therefore oppose each other in the shunt, consisting of the short part of the line-wire, and will be compelled to flow along said line-wire, the impulses from K' to the right and the impulses from K to the left. It is unnecessary for me to describe more in detail this arrangement and the resultant flows of currents, as persons versed in the art readily understand what is meant by opposing currents and opposing coils, and it is obvious from the foregoing description, in connection with Fig. 1, that it is my aim to so arrange the coils that the induced currents are forced to flow over the line-wire in preference to flowing through the shunt.

In Fig. 2 the source of alternating or phase current F is connected directly to the line of transmission, and the two sources of direct or straight current A and A' are connected in shunt to part of the line-wire. These two sources A and A' are connected together in opposition as to each other, the arrows indicating the flow of the currents, and as these currents would oppose each other in the shunt they are again compelled to flow over the line. In this figure $b$ and $b'$ are two wires, to which are connected the motor N, with the interposition of the impedance D. To the line are also connected the wires $b^2$ and $b^3$, with the interposition of the condenser M. In the circuit formed thereof are placed the lamps $l\ l$. It is well understood that the condenser M effectually retards the flow of the direct current, and it is also understood that the impedance-coil D is an effectual bar to the flow of the alternating or phase current, more specially if at one and the same time another circuit is established minus the impedance and minus any electromagnetic devices. In this arrangement, therefore, the motor N will be supplied with a current from the source A or A' and the lamps $l$ will be supplied with a current from the source F. I have also illustrated in dotted lines a branch circuit from the main line for the purpose of showing that branch circuits may be taken from the line from both sides of the shunt to which A and A' are connected.

In Fig. 3 the arrangement as to the source of current is the same as illustrated in Fig. 1. In this figure is shown the trolley C, connected through the wheel to the line of transmission B. To the trolley-pole—that is, to the conducting part of the same—is connected the impedance D, and to this impedance are connected the field-coils E of the motor N. The free terminal of the coils is connected at G to the second line of transmission B'. To the trolley-pole—that is, to the conducting part of the same—is also connected one terminal of the condenser M, the other terminal of which is connected to one terminal of the armature N', the free terminal of which is also connected at G to the line B'. In this arrangement the direct current will flow from B, through C, through D, through E, through B', back to its source, and the alternating or phase current will flow from B, through C, through M, through N', through B', through L, back to its source. The armature of the motor therefore will be supplied with the alternating or phase current, and the field-coils of this motor will be supplied with straight or direct current. I do not deem it necessary to point out the advantages arising from this arrangement, as the same are well understood.

Having now described my invention, what I claim as new, and desire to secure by Letters Patent, is—

1. The method of transmitting direct and alternating or phase currents over a common line-wire which consists in connecting one source of current to said line-wire, and connecting the second source of current in shunt as to part of said line-wire, in a manner, so that the, at one and the same time generated impulses oppose each other in said shunt.

2. The method of transmitting over a common line-wire and feeding different parts of a consuming device with different currents of electricity from said line-wire which consists in connecting the source of one of said currents to the line-wire and connecting the source of the second of said currents in shunt as to part of said line-wire and connecting one part of the consuming device with the interposition of an impedance to the line-wire and connecting the other part of said consuming device with the interposition of a condenser to said line-wire.

3. The method of transmitting over a common line-wire, simultaneously, alternating or phase currents and straight or direct currents which consists in connecting one source of current to the line-wire and connecting the second source of current in shunt as to part of said line-wire; the currents generated in the second source of electricity opposing each other in said shunt.

4. The method of transmitting over a common line-wire straight currents of electricity simultaneously with alternating or phase currents of electricity, and feeding different consuming devices each with a different current from said line-wire which consists in connecting one source of current to said line-wire and the second source of current in shunt as to part of said line-wire, and connecting one of the consuming devices to the line-wire, with the interposition of a device retarding the flow of the direct current and connecting the second of the consuming devices to said line-wire with the interposition of a device retarding the flow of the alternating or phase current.

In testimony whereof I hereby sign my name, in the presence of two subscribing witnesses, this 12th day of July, A. D. 1901.

ISIDOR KITSEE.

Witnesses:
　EDITH R. STILLEY,
　CHAS. KRESSENBUCH.